US012014855B1

(12) United States Patent
Heo et al.

(10) Patent No.: US 12,014,855 B1
(45) Date of Patent: Jun. 18, 2024

(54) HAPTIC ACTUATOR BASED ON NUTATION STRUCTURE USING SQUEEZE MODE OF MAGNETO-RHEOLOGICAL FLUID

(71) Applicant: Korea University Of Technology And Education Industry-University Cooperation Foundation, Cheonan-si (KR)

(72) Inventors: Yong Hae Heo, Cheonan-si (KR); Hyun-U Ko, Cheonan-si (KR); Seok-Han Lee, Cheonan-si (KR); Seang Ho Kim, Jincheon-gun (KR); Sang-Youn Kim, Seoul (KR)

(73) Assignee: Korea University Of Technology And Education Industry-University Cooperation Foundation, Cheonan-si (KR)

( * ) Notice: Subject to any disclaimer, the term of this patent is extended or adjusted under 35 U.S.C. 154(b) by 0 days.

(21) Appl. No.: 18/175,332

(22) Filed: Feb. 27, 2023

(51) Int. Cl.

| | |
|---|---|
| ***H01F 7/20*** | (2006.01) |
| ***H01F 1/44*** | (2006.01) |
| ***H01F 13/00*** | (2006.01) |

(52) U.S. Cl.
CPC ............ *H01F 13/00* (2013.01); *H01F 1/447* (2013.01); *H01F 7/20* (2013.01)

(58) Field of Classification Search
CPC ................................ H01F 1/447; F16F 9/535
See application file for complete search history.

(56) References Cited

U.S. PATENT DOCUMENTS

| | | | | |
|---|---|---|---|---|
| 8,424,656 | B2 * | 4/2013 | Hiemenz | F16F 9/3415 188/267.2 |
| 11,599,136 | B1 * | 3/2023 | Morrison | G06F 3/016 |
| 2022/0171470 | A1 * | 6/2022 | Drezet | H01F 7/20 |

* cited by examiner

*Primary Examiner* — Ramon M Barrera
(74) *Attorney, Agent, or Firm* — Studebaker & Brackett PC

(57) ABSTRACT

The present invention relates to a haptic actuator based on a nutation structure using a squeeze mode of a magneto-rheological fluid, which compresses a magneto-rheological fluid (MR fluid) by using a rotary body capable of performing a rotary motion based on a nutation structure, thereby generating a sustainable rotational resistance force by using a squeeze mode and a flow mode of the MR fluid.

10 Claims, 4 Drawing Sheets

HAPTIC ACTUATOR BASED ON NUTATION STRUCTURE USING SQUEEZE MODE OF MAGNETO-RHEOLOGICAL FLUID

TECHNICAL FIELD

The present invention relates to a haptic actuator based on a nutation structure using a squeeze mode of a magneto-rheological fluid, and more particularly, to a haptic actuator based on a nutation structure using a squeeze mode of a magneto-rheological fluid, which compresses a magneto-rheological fluid (MR fluid) by using a rotary body capable of performing a rotary motion based on a nutation structure, thereby generating a sustainable rotational resistance force by using a squeeze mode and a flow mode of the MR fluid.

BACKGROUND ART

In general, a magneto-rheological fluid (MR fluid) refers to a fluid having an effect of increasing fluid flow resistance, which is similar to an ER effect, when a magnetic field is loaded. The MR fluid is a fluid made by dispersing paramagnetic particles in a solvent having low magnetic permeability. When no magnetic field is loaded, the MR fluid performs a motion similar to a motion of a Newtonian fluid in which particles freely move. However, when a magnetic field is loaded, the MR fluid performs a motion similar to a motion of a Bingham fluid that has yield stress as particles are charged and a chain structure is formed.

The MR fluid is used to design, manufacture, and position various applications and control vibration. For example, the MR fluid is used for a shock absorber for a vehicle, an impact damper, an engine mount, a vehicle suspension, and the like.

Meanwhile, the MR fluid may be applied to a rotary-type haptic actuator and the like. The rotary type haptic actuator in the related art is focused on a shear mode in which the most basically resistive force is generated, and a flow mode in which a resistive force is generated as a bar is added to a shaft and pushes the fluid.

The advantage of the rotary-type haptic actuator is that the rotary-type haptic actuator may rotate infinitely. However, because it is difficult to infinitely repeat a rotary motion in case that a squeeze mode is applied, there is a limitation in applying the squeeze mode having a high resistive force.

SUMMARY OF THE INVENTION

The present invention has been made in an effort to solve the above-mentioned problem, and an object of the present invention is to provide a haptic actuator based on a nutation structure using a squeeze mode of a magneto-rheological fluid, which compresses a magneto-rheological fluid (MR fluid) by using a rotary body capable of performing a rotary motion based on a nutation structure, thereby generating a sustainable rotational resistance force by using a squeeze mode and a flow mode of the MR fluid.

An embodiment of the present invention provides a haptic actuator based on a nutation structure using a squeeze mode of a magneto-rheological fluid, the haptic actuator including: an actuator housing 110 having an interior filled a magneto-rheological fluid (MR fluid); a rotary body 120 configured to compress the MR fluid by rotating in the actuator housing 110; and a coil 130 provided on an inner surface of the actuator housing 110 and configured to generate a magnetic field by applied electric current, in which a rotational resistance force is generated in the MR fluid as the rotary body 120 rotates and compresses the MR fluid activated by the magnetic field generated by the coil 130.

In the embodiment, the actuator housing 110 may be provided to be divided into an upper housing 111 and a lower housing 112.

In the embodiment, the upper housing 111 may have a vertical through-hole 111*a* that a shaft 121 extending from one side of the rotary body 120 penetrates upward.

In the embodiment, an O-ring 113 may be provided in the vertical through-hole 111*a* to prevent the MR fluid in the actuator housing 110 from leaking, and a bearing 114 may be provided in the vertical through-hole 111*a* to support the shaft 121 and reduce frictional resistance when the shaft 121 rotates.

In the embodiment, the rotary body 120 may include: a rotary sphere 122 provided at a central portion of the actuator housing 110 and configured to rotate by means of the shaft 121; and a circular compression plate 123 protruding outward from the rotary sphere 122 and configured to compress the MR fluid in a state in which the circular compression plate 123 is inclined at a predetermined angle.

In the embodiment, the circular compression plate 123 may have one or more flow paths 123*a* through which the compressed MR fluid flows in a vertical direction.

In the embodiment, when the rotary sphere 122 rotates, the circular compression plate 123 inclined at the predetermined angle may repeatedly compress the MR fluid, such that a rotational resistance force in a flow mode is additionally generated as the MR fluid flows through the flow path 123*a*.

In the embodiment, when the rotary sphere 122 rotates, the circular compression plate 123 inclined at the predetermined angle may repeatedly compress the MR fluid, such that a rotational resistance force is consistently generated by the MR fluid.

In the embodiment, an electropermanent magnet (EPM) may be applied to the coil 130.

In the embodiment, the electropermanent magnet may include: a circular alnico magnet provided along an edge of an inner surface of the actuator housing 110; a circular neodymium magnet provided on an inner surface of the alnico magnet while defining a concentric circle; and a solenoid coil wound around the alnico magnet and the neodymium magnet.

According to one aspect of the present invention, the haptic actuator compresses the magneto-rheological fluid (MR fluid) by using the rotary body capable of performing the rotary motion based on the nutation structure, which makes it possible to maximize the sustainable rotational resistance force by using the squeeze mode and the flow mode of the MR fluid, thereby improving speed reduction efficiency.

DETAILED DESCRIPTION

Hereinafter, exemplary embodiments are proposed to help understand the present invention. However, the following embodiments are provided just for more easily understanding the present invention, and the contents of the present invention are not limited by the embodiments.

Figure 1:
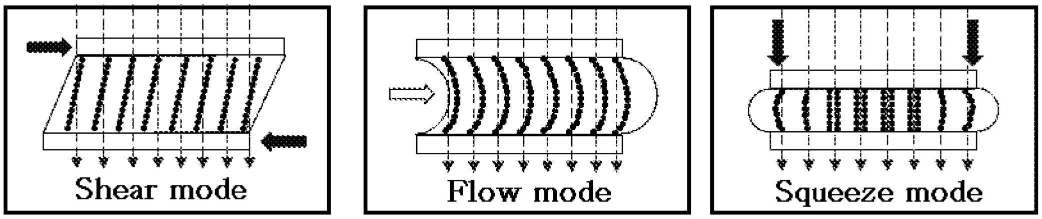
FIG. 1 is a conceptual view for explaining an operational principle of a magneto-rheological fluid (MR fluid).
Figure 2:
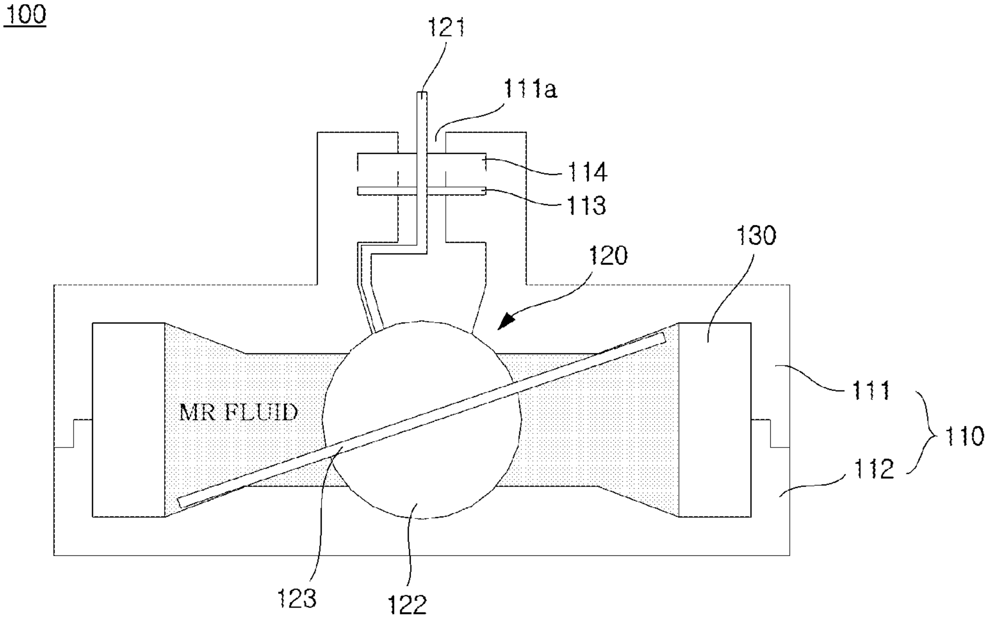
FIG. 2 is a cross-sectional view illustrating a structure of a haptic actuator 100 based on a nutation structure using a squeeze mode of a magneto-rheological fluid according to an embodiment of the present invention.

FIG. 1 is a conceptual view for explaining an operational principle of a magneto-rheological fluid (MR fluid), and FIG. 2 is a cross-sectional view illustrating a structure of a haptic actuator 100 based on a nutation structure using a squeeze mode of a magneto-rheological fluid according to an embodiment of the present invention.

First, referring to FIG. 1, a magneto-rheological fluid (MR fluid) generates resistive forces in accordance with three modes such as a shear mode, a flow mode, and a squeeze mode. When any one of the three modes occurs, the resistive force is generated as viscosity of the MR fluid is changed.

In general, intensity of the resistive force is highest in the squeeze mode, and the intensity of the resistive force decreases in the order of the flow mode and the shear mode. In the squeeze mode, the intensity of the resistive force varies depending on a depth by which the MR fluid is pressed. In the present invention, a continuous rotational resistance force is generated by repeatedly pressing the MR fluid by performing a rotary motion based on a nutation structure without pressing the MR fluid only once. This will be described below.

FIG. 2 is a cross-sectional view illustrating a structure of the haptic actuator 100 based on a nutation structure using a squeeze mode of a magneto-rheological fluid according to the embodiment of the present invention.

Referring to FIG. 2, the haptic actuator 100 based on a nutation structure using a squeeze mode of a magneto-rheological fluid according to the embodiment of the present invention broadly includes an actuator housing 110, a rotary body 120, and a coil 130.

First, an interior of the actuator housing 110 is filled with the MR fluid and accommodates the rotary body 120 and the coil 130. The actuator housing 110 may be formed to have a single structure. However, in the present invention, the actuator housing 110 may be provided to be divided into an upper housing 111 and a lower housing 112. In this case, the upper housing 111 and the lower housing 112 may each have a plurality of bolt holes (not illustrated) formed in a vertical direction. Bolts and nuts (not illustrated) are fastened to the respective bolt holes to generate a high fastening force that prevents the MR fluid from leaking to the outside.

The MR fluid is an intelligent fluid that is changed in phase by a magnetic field. The MR fluid is an intelligent fluid that may include a base fluid, such as silicone oil, and magnetic particles and control a flow of the fluid in accordance with an external magnetic field. In addition, the MR fluid has a very high reactivity and excellent yield stress when flowing. In particular, the MR fluid has a high damping force even with low electric power. Therefore, the MR fluid may be used for applications that require a high rotational resistance force.

As shown in the following equation, the yield stress of the MR fluid is proportional to magnetic flux density B, and the magnetic flux density is proportional to a magnetic flux Φ formed in a magnetic circuit and inversely proportional to a magnetization area A.

$$B=\Phi/A \quad \text{[Equation]}$$

(Here, B represents magnetic flux density, Φ represents magnetic flux, and A represents a magnetization area.)

Therefore, the MR fluid stored in the actuator housing 110 generates a high rotational resistance force by the squeeze mode applied when the rotary body 120 rotates. The rotational resistance force is transmitted to a shaft 121 connected to the rotary body 120, such that the high rotational resistance force is transmitted to an object connected to the shaft 121.

The interior of the actuator housing 110 has an internal space that sufficiently accommodates a rotary sphere 122 and a circular compression plate 123 of the rotary body 120, which will be described below. In particular, because the circular compression plate 123 rotates in a state of being inclined at a predetermined angle, the circular compression plate 123 needs to have a large rotation radius. Therefore, in consideration of the rotation radius, the internal space having a sufficient size is formed in the actuator housing 110.

In the embodiment, the upper housing 111 has a vertical through-hole 111*a* formed in the vertical direction.

The vertical through-hole 111*a* is a passageway through which the shaft 121 of the rotary body 120, which will be described below, penetrates vertical through-hole 111*a* in the vertical direction. In particular, an O-ring 113 is provided in the vertical through-hole 111*a* to prevent the MR fluid in the actuator housing 110 from leaking. A bearing 114 is provided in the vertical through-hole 111*a* to support the shaft 121 and reduce frictional resistance when the shaft 121 rotates.

Figure 3:
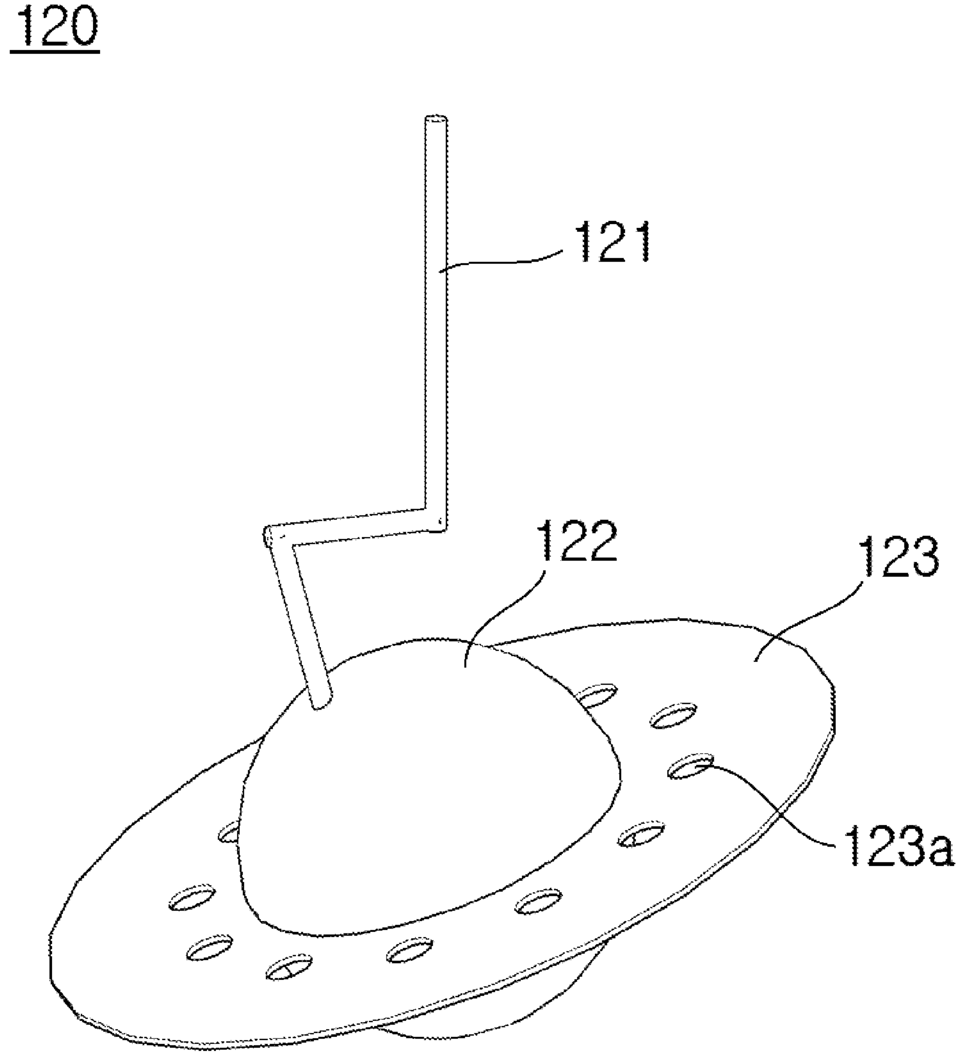
FIG. 3 is a view more specifically illustrating a structure of a rotary body 120.

FIG. 3 is a view more specifically illustrating a structure of the rotary body 120.

Referring to FIG. 3, the rotary body 120 forms the squeeze mode by compressing the MR fluid while rotating at a central portion of the actuator housing 110. To this end, the rotary body 120 includes the rotary sphere 122 provided at the central portion of the actuator housing 110, and the circular compression plate 123 provided on the rotary sphere 122.

The rotary sphere 122 rotates in a state in which one side of the rotary sphere 122 is connected through the shaft 121. In this case, the rotational resistance force applied to the circular compression plate 123 is transmitted to the shaft 121 through the rotary sphere 122.

The rotary sphere 122 is a perfect sphere. In contrast, the circular compression plate 123 is inclined at a predetermined angle (e.g., 45 degrees) without horizontally protruding from an outer side of the rotary sphere 122. In this case, an angle at which the circular compression plate 123 is inclined has a numerical value, which may be changed as much as needed, without being limited to 45 degrees.

The circular compression plate 123 is formed to be inclined at a predetermined angle while protruding outward from a lateral surface of the rotary sphere 122 and defines a predetermined rotation radius in the vertical direction along with the rotation of the rotary sphere 122.

The circular compression plate 123 forms the squeeze mode by strongly compressing the MR fluid stored in the actuator housing 110. The activated MR fluid generates a high rotational resistance force by the squeeze mode of the circular compression plate 123.

In addition, in the embodiment, the circular compression plate 123 may induce the flow mode of the MR fluid in addition to the squeeze mode. This configuration will be described below.

The circular compression plate 123 has a plurality of flow paths 123*a* formed in the vertical direction. The flow paths 123*a* may induce the flow mode formed by the flow of the MR fluid passing through the flow paths 123*a* in addition to the squeeze mode in which the MR fluid is compressed by the circular compression plate 123. Therefore, the circular compression plate 123 may maximize the rotational resistance force by simultaneously generating the rotational resistance force by the squeeze mode of the MR fluid and the rotational resistance force by the flow mode of the MR fluid. In this case, the number of flow paths 123*a* is not limited. However, an excessively large number of flow paths 123*a* may degrade the compressive force in the squeeze mode. Therefore, it is noted that the number of flow paths 123*a* is set so as not to greatly affect the compressive force.

Figure 4:
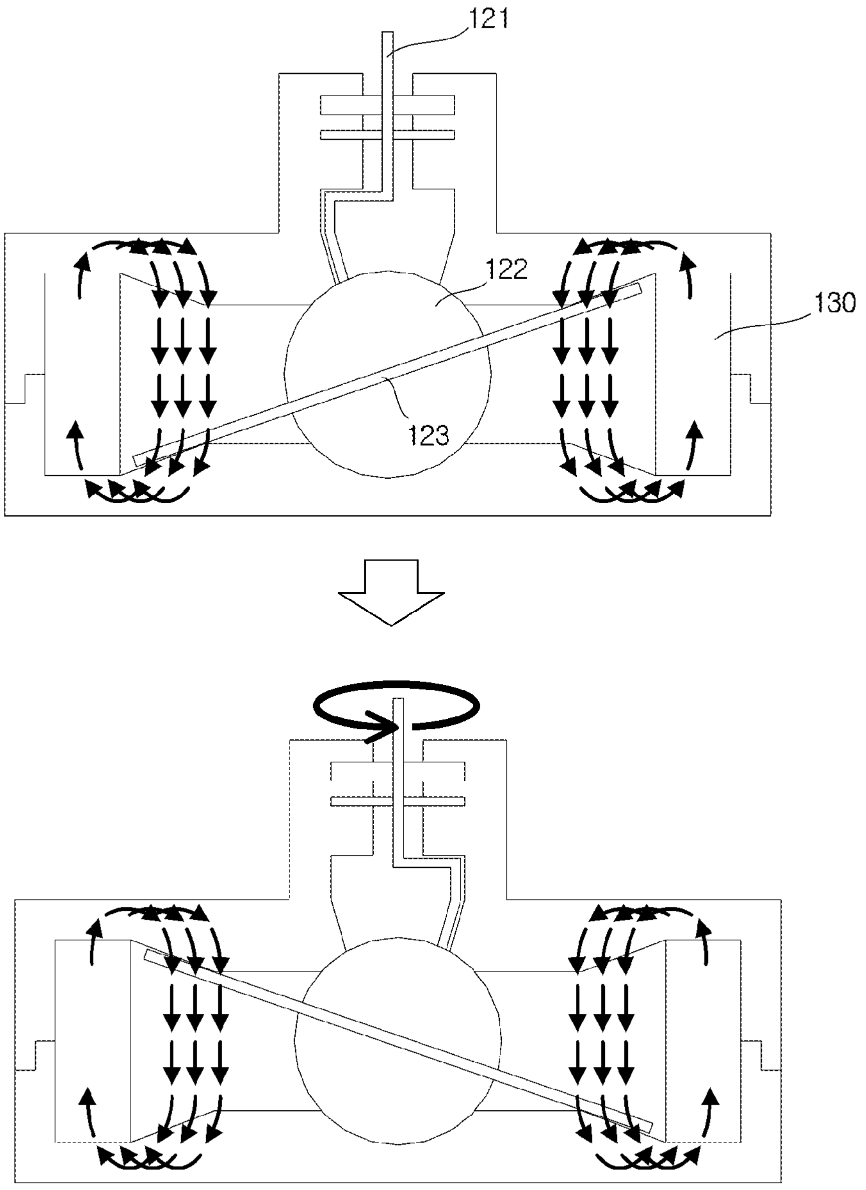
FIG. 4 is a view illustrating a rotational resistance force generated when the rotary body 120 performs a rotary motion.

FIG. 4 is a view illustrating a rotational resistance force generated when the rotary body 120 performs a rotary motion.

Referring to FIG. 4, the rotary sphere 122 performs a rotary motion in a state of being connected to the shaft 121. In this case, the circular compression plate 123 continuously compresses the MR fluid in the actuator housing 110 in the state in which the circular compression plate 123 is inclined at a predetermined angle.

In particular, because the circular compression plate 123 repeatedly compresses the MR fluid when performing the rotary motion as illustrated in FIG. 4, the rotation range is not limited. In case that an angle of the shaft 121 is changed, the circular compression plate 123 may be applied to a haptic actuator provided in the form of a joystick.

The coil 130 is provided circularly along an edge of an inner surface of the actuator housing 110 and generates a magnetic field by an applied electric current.

More specifically, the coil 130 generates a magnetic field by means of electric current applied from the outside, and the generated magnetic field changes viscosity by activating the MR fluid therein. In this case, in addition to the structure that consistently applies the electric current, an electropermanent magnet (EPM), which may generate or release a continuous magnetic field by applying the electric current only for a predetermined time, may be applied to the coil 130. This configuration will be described below.

Figure 5:
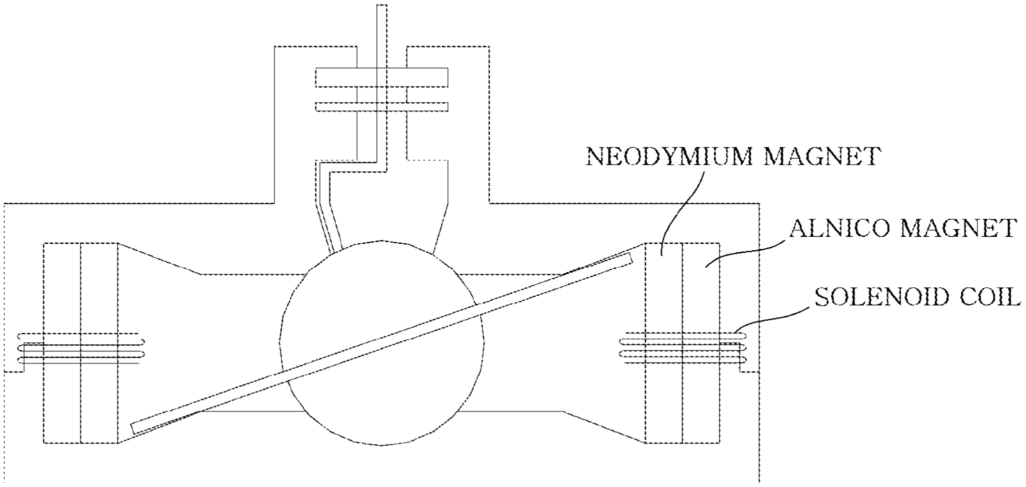
FIG. 5 is a view illustrating a structure of a coil 130 to which an electropermanent magnet (EPM) is applied.

FIG. 5 is a view illustrating a structure of the coil 130 to which the electropermanent magnet (EPM) is applied.

Referring to FIG. 5, the electropermanent magnet is characterized in that a magnetic field is formed outside the EPM when the electric current is applied, and the magnetic field is maintained without change even though the electric current is released. On the contrary, when the electric current is applied in a direction reverse to the direction of the electric current that has been previously applied to the EPM, the magnetic field formed outside the EPM disappears.

In the present invention, the EPM may include: a circular alnico magnet provided along an edge of an inner surface of the actuator housing 110; a circular neodymium magnet provided to define a concentric circle on an inner surface of the alnico magnet; and a solenoid coil wound around the alnico magnet and the neodymium magnet.

First, because the neodymium magnet and the alnico magnet define a closed circuit in an initial state of the EPM, no magnetic field is generated. In this state, when the initial electric current is applied to the EPM, the direction of the magnetic field of the alnico magnet becomes identical to the direction of the magnetic field of the neodymium magnet by the magnetic field generated by the solenoid coil, such that a stronger magnetic field is formed. The magnetic field is greatly advantageous in generating or releasing a continuous magnetic field even by applying the electric current for a predetermined time even though the electric current is not consistently applied to the solenoid coil.

In particular, in case that the EPM is substituted for the coil 130, the EPM may be used for the haptic actuator because it is not necessary to apply continuous electric current to generate a high rotational resistance force.

While the present invention has been described above with reference to the exemplary embodiments, it may be understood by those skilled in the art that the present invention may be variously modified and changed without departing from the spirit and scope of the present invention disclosed in the claims.

The invention claimed is:

1. A haptic actuator based on a nutation structure using a squeeze mode of a magneto-rheological fluid, the haptic actuator comprising:

an actuator housing 110 having an interior filled with a magneto-rheological fluid (MR fluid);

a rotary body 120 configured to compress the MR fluid by rotating in the actuator housing 110; and a coil 130 provided on an inner surface of the actuator housing 110 and configured to generate a magnetic field by applied electric current, wherein a rotational resistance force is generated in the MR fluid as the rotary body 120 rotates and compresses the MR fluid activated by the magnetic field generated by the coil 130.

2. The haptic actuator of claim 1, wherein the actuator housing 110 is provided to be divided into an upper housing 111 and a lower housing 112.

3. The haptic actuator of claim 2, wherein the upper housing 111 has a vertical through-hole 111*a* that a shaft 121 extending from one side of the rotary body 120 penetrates upward.

4. The haptic actuator of claim 3, wherein an O-ring 113 is provided in the vertical through-hole 111*a* to prevent the MR fluid in the actuator housing 110 from leaking, and a bearing 114 is provided in the vertical through-hole 111*a* to support the shaft 121 and reduce frictional resistance when the shaft 121 rotates.

5. The haptic actuator of claim 1, wherein the rotary body 120 comprises:

a rotary sphere 122 provided at a central portion of the actuator housing 110 and configured to rotate by means of a shaft 121; and a circular compression plate 123 protruding outward from the rotary sphere 122 and configured to compress the MR fluid in a state in which the circular compression plate 123 is inclined at a predetermined angle.

6. The haptic actuator of claim 5, wherein the circular compression plate 123 has one or more flow paths 123*a* through which the compressed MR fluid flows in a vertical direction.

7. The haptic actuator of claim 6, wherein when the rotary sphere 122 rotates, the circular compression plate 123 inclined at the predetermined angle repeatedly compresses the MR fluid, such that a rotational resistance force in a flow mode is additionally generated as the MR fluid flows through the flow path 123*a*.

8. The haptic actuator of claim 5, wherein when the rotary sphere 122 rotates, the circular compression plate 123 inclined at the predetermined angle repeatedly compresses the MR fluid, such that a rotational resistance force is consistently generated by the MR fluid.

9. The haptic actuator of claim 1, wherein the coil 130 is an electropermanent magnet (EPM).

10. The haptic actuator of claim 9, wherein the electropermanent magnet comprises:

a circular alnico magnet provided along an edge of an inner surface of the actuator housing 110;

a circular neodymium magnet provided on an inner surface of the alnico magnet while defining a concentric circle; and a solenoid coil wound around the alnico magnet and the neodymium magnet.

* * * * *